(12) United States Patent
Park et al.

(10) Patent No.: US 12,506,194 B2
(45) Date of Patent: Dec. 23, 2025

(54) POWER STORAGE APPARATUS

(71) Applicant: LG ENERGY SOLUTION, LTD., Seoul (KR)

(72) Inventors: Dong-Ho Park, Daejeon (KR); Ji-Ho Yoo, Daejeon (KR); Seung-Jun Lee, Daejeon (KR); Yong-Tae Lee, Daejeon (KR); Jong-Soo Lee, Daejeon (KR); Sang-Woo Hong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 550 days.

(21) Appl. No.: 17/924,195

(22) PCT Filed: Sep. 13, 2021

(86) PCT No.: PCT/KR2021/012446
§ 371 (c)(1),
(2) Date: Nov. 9, 2022

(87) PCT Pub. No.: WO2022/060044
PCT Pub. Date: Mar. 24, 2022

(65) Prior Publication Data
US 2023/0178822 A1 Jun. 8, 2023

(30) Foreign Application Priority Data
Sep. 21, 2020 (KR) .................. 10-2020-0121707

(51) Int. Cl.
*H01M 10/6568* (2014.01)
*H01M 10/48* (2006.01)
*H01M 10/6556* (2014.01)

(52) U.S. Cl.
CPC ..... *H01M 10/6568* (2015.04); *H01M 10/486* (2013.01); *H01M 10/6556* (2015.04)

(58) Field of Classification Search
None
See application file for complete search history.

(56) References Cited

U.S. PATENT DOCUMENTS

| | | |
|---|---|---|
| 2010/0279153 A1 | 11/2010 | Payne |
| 2015/0188203 A1 | 7/2015 | Enomoto et al. |
| 2017/0122679 A1* | 5/2017 | Kenney .................. F28F 3/10 |

(Continued)

FOREIGN PATENT DOCUMENTS

| | | | |
|---|---|---|---|
| DE | 10 2013 214 138 A1 | 1/2015 | |
| EP | 2 426 779 A2 | 3/2012 | |

(Continued)

OTHER PUBLICATIONS

International Search Report for PCT/KR2021/012446 mailed on Jan. 3, 2022.

(Continued)

*Primary Examiner* — Scott J. Chmielecki
(74) *Attorney, Agent, or Firm* — Birch, Stewart, Kolasch & Birch, LLP (57) ABSTRACT

An energy system includes a battery rack having a battery cell and having a cooling channel for cooling the battery cell, a coolant tank having a predetermined coolant, a pipe configured to circulate the coolant between the battery rack and the coolant tank, and a pump configured to adjust the supply of the coolant to the battery rack.

10 Claims, 7 Drawing Sheets

(56) References Cited

U.S. PATENT DOCUMENTS

| | | | | |
|---|---|---|---|---|
| 2017/0256831 A1* | 9/2017 | Hong | ................. | H01M 10/482 |
| 2017/0361677 A1 | 12/2017 | Kim et al. | | |
| 2019/0152286 A1 | 5/2019 | Lee et al. | | |
| 2019/0165438 A1 | 5/2019 | Kim | | |
| 2019/0190095 A1* | 6/2019 | Park | ..................... | B60L 3/0084 |
| 2019/0198954 A1* | 6/2019 | Miura | ................. | H01M 10/613 |
| 2021/0159558 A1 | 5/2021 | Kim et al. | | |

FOREIGN PATENT DOCUMENTS

| | | |
|---|---|---|
| EP | 3 260 319 A1 | 12/2017 |
| EP | 3 322 015 A1 | 5/2018 |
| JP | 2012-156010 A | 8/2012 |
| JP | 2012-530330 A | 11/2012 |
| JP | 2014-60088 A | 4/2014 |
| JP | 2017-229223 A | 12/2017 |
| KR | 10-2012-0066340 A | 6/2012 |
| KR | 10-2014-0145250 A | 12/2014 |
| KR | 10-2017-0008603 A | 1/2017 |
| KR | 10-2018-0121245 A | 11/2018 |
| KR | 10-2019-0053468 A | 5/2019 |
| KR | 10-2019-0057980 A | 5/2019 |
| KR | 10-2019-0064057 A | 6/2019 |
| KR | 10-2020003 B1 | 9/2019 |
| KR | 10-2031645 B1 | 10/2019 |
| KR | 10-2154314 B1 | 9/2020 |

OTHER PUBLICATIONS

Extended European Search Report for European Application No. 21869666.4, dated Nov. 22, 2023.

* cited by examiner

POWER STORAGE APPARATUS

TECHNICAL FIELD

The present disclosure relates to an energy storage system.

The present application claims priority to Korean Patent Application No. 10-2020-0121707 filed on Sep. 21, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or a battery rack by using at least one battery module and adding other components. The battery pack is generally provided as an energy source of an electric vehicle or the like, and recently, as an energy source for home or industrial use, an energy storage system including a plurality of battery racks is attracting attention.

In the case of a conventional energy storage system, particularly in the case of an energy storage system including a high-temperature battery cell having a management temperature of about 45° C. to 55° C., it is necessary to construct a suitable thermal management system in a high-temperature region.

In the case of a conventional energy storage system including room-temperature battery cells with a management temperature of about 19° C. to 27° C., the temperature of a battery cell or an area around the battery cell is managed by using air conditioning equipment for heating and cooling, for example an air conditioner.

However, by using the conventional thermal management system of the energy storage system including room-temperature battery cells, it is difficult to manage an energy storage system including a high-temperature battery cell.

Therefore, even in an energy storage system including high-temperature battery cells, it is required to find a way to more effectively manage the temperature of the battery cell or the area around the battery cell.

DISCLOSURE

Technical Problem

The present disclosure is designed to solve the problems of the related art, and therefore the present disclosure a Therefore, the present disclosure is directed to providing an energy storage system, which may more efficiently manage the temperature of a battery cell or an area around the battery cell.

In addition, the present disclosure is also directed to providing an energy storage system, which may maintain an appropriate temperature of the battery cell according to the management temperature of the battery cell.

Technical Solution

In one aspect of the present disclosure, there is provided an energy storage system, comprising: a battery rack including at least one battery cell and having a cooling channel for cooling the at least one battery cell; a coolant tank spaced apart from the battery rack by a predetermined distance and having a predetermined coolant; a pipe configured to connect the coolant tank and the battery rack and configured to circulate the coolant between the battery rack and the coolant tank; and a pump connected to the pipe, disposed between the coolant tank and the battery rack, and configured to adjust the supply of the coolant to the battery rack.

The battery rack may include an inlet port into which the coolant is introduced, the inlet port being configured to communicate with the cooling channel; and an outlet port spaced apart from the inlet port by a predetermined distance and configured to communicate with the cooling channel, the coolant tank may include a coolant outlet port configured to discharge the coolant toward the battery rack; and at least one coolant inlet port spaced apart from the coolant outlet port and configured such that the coolant discharged from the battery rack is introduced thereto, and the pump may be disposed between the inlet port of the battery rack and the coolant outlet port of the coolant tank.

The energy storage system may further comprise an opening/closing valve connected to the pipe and provided between the pump and the coolant outlet port of the coolant tank.

The energy storage system may further comprise at least one heat exchanger disposed between the outlet port of the battery rack and the at least one coolant inlet port of the coolant tank.

The energy storage system may further comprise a diverging valve connected to the pipe and provided between the at least one heat exchanger and the coolant tank.

The at least one heat exchanger may include a first heat exchanger disposed between the battery rack and the diverging valve; and a second heat exchanger spaced apart from the first heat exchanger by a predetermined distance and disposed between the diverging valve and the coolant tank.

The energy storage system may further comprise at least one fan unit configured to cool the at least one heat exchanger.

The battery rack may include at least one rack temperature sensor configured to detect a temperature of the at least one battery cell.

The battery rack may include a fire sensor configured to detect a fire of the at least one battery cell.

The coolant tank may include a heater configured to raise a temperature of the coolant.

Advantageous Effects

According to various embodiments as above, it is possible to provide an energy storage system, which may more efficiently manage the temperature of a battery cell or an area around the battery cell.

In addition, according to various embodiments as above, it is possible to provide an energy storage system, which may maintain an appropriate temperature of the battery cell according to the management temperature of the battery cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
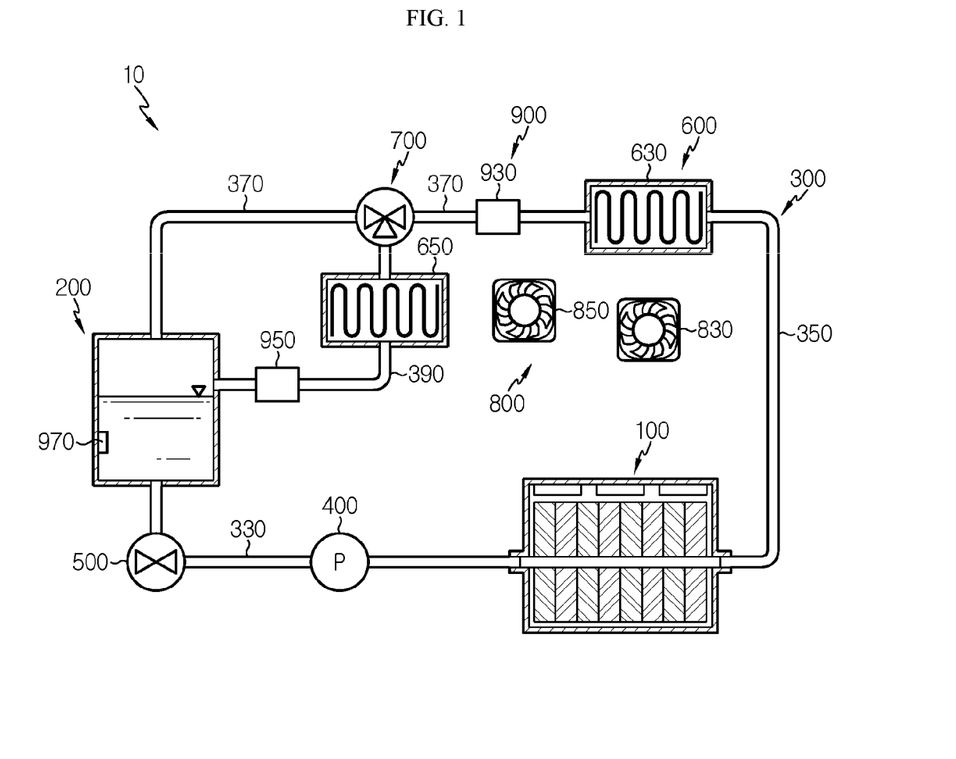
FIG. 1 is a diagram for illustrating an energy storage system according to an embodiment of the present disclosure.

FIG. 1 is a diagram for illustrating an energy storage system according to an embodiment of the present disclosure.

Referring to FIG. 1, the energy storage system 10 may include a battery rack 100, a coolant tank 200, a pipe unit 300, and a pump unit 400.

The battery rack 100 includes at least one battery cell 110 (see FIG. 2), and may include a cooling channel 130 (see FIG. 2) for cooling the at least one battery cell 110.

Hereinafter, the battery rack 100 will be described in more detail with reference to FIG. 2.

Figure 2:
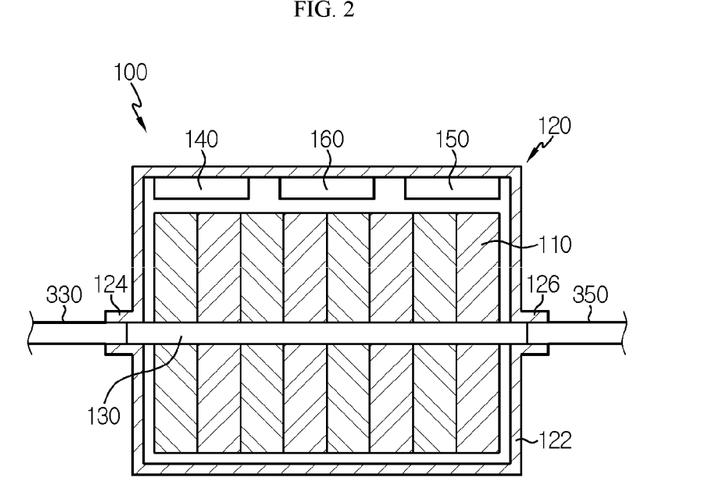
FIG. 2 is a diagram for illustrating a battery rack of the energy storage system according to an embodiment of the present disclosure.

FIG. 2 is a diagram for illustrating a battery rack of the energy storage system according to an embodiment of the present disclosure.

Referring to FIG. 2, the battery rack 100 may include a battery cell 110, a rack case 120, a cooling channel 130, a rack temperature sensor 140, a fire sensor 150, and a control unit 160.

The battery cell 110 is a secondary battery, and may be provided as a pouch-type secondary battery, a rectangular secondary battery, or a cylindrical secondary battery. Hereinafter, in this embodiment, the battery cell 110 will be described as a pouch-type secondary battery.

At least one battery cell 110 or a plurality of battery cells 110 may be provided. Hereinafter, in this embodiment, it will be described that a plurality of battery cells 110 are provided.

The plurality of battery cells 110 may be provided as high-temperature battery cells. The high-temperature battery cell generally has a management temperature of 45° C. to 55° C., which may mean optimal battery cells in terms of battery performance and lifespan in a high-temperature region to which the management temperature belongs. If the battery rack 10 includes a plurality of battery cells 110, the battery rack 10 may be used, for example, in a tropical climate region.

The rack case 120 may accommodate the plurality of battery cells 110, the cooling channel 130, the rack temperature sensor 140, the fire sensor 150, the control unit, and various electrical components of the battery rack 100.

To this end, the rack case 120 may have an accommodation space capable of accommodating the plurality of battery cells 110, the cooling channel 130, the rack temperature sensor 140, the fire sensor 150, the control unit, and various electrical components of the battery rack 100.

The rack case 120 may include a case body 122, an inlet port 124, and an outlet port 126.

The case body 122 may have an inner space of a predetermined size so that the accommodation space may be provided. The plurality of battery cells 110, the cooling channel 130, the rack temperature sensor 140, the fire sensor 150, the control unit, and various electric components of the battery rack 100 may be accommodated in the case body 120.

A coolant 220 of the coolant tank 200, explained later, is introduced through the inlet port 124, and the inlet port 124 may be formed at one side of the case body 122. The inlet port 124 may communicate with the cooling channel 130, explained later.

The outlet port 126 is formed at the other side of the case body 122, and may be disposed to be spaced apart from the inlet port 124 by a predetermined distance. The outlet port 126 communicates with the cooling channel 130, explained later, and the coolant 220 that has passed through the cooling channel 130, explained later, may be discharged out of the case body 122 through the outlet port 126.

The cooling channel 130 is provided to the case body 122, and may communicate with the inlet port 124 and the outlet port 126. The cooling channel 130 may cool the plurality of battery cells 110. For this, the coolant 220, explained later, may pass through the cooling channel 130.

The rack temperature sensor 140 is provided inside the case body 122, and may detect or measure a temperature of at least one of the plurality of battery cells 110 in the case body 122.

The fire sensor 150 is provided inside the case body 122, and may detect an abnormal condition or the like of the plurality of battery cells 110 in the case body 122. For example, when a fire situation in the plurality of battery cells 110 occurs, the fire sensor 150 may detect a fire in the at least one or more plurality of battery cells 110. Specifically, the fire sensor 150 may detect a flame or smoke generated at the battery cells 110.

The control unit 160 is for managing and controlling the battery rack 100, and may be electrically connected to the plurality of battery cells 110, the rack temperature sensor 140, and the fire sensor 150.

The control unit 160 may be provided to be electrically connected to the coolant tank 200, the pump unit 400, a heat exchange unit 600, a diverging valve 700, a fan unit 800, and a temperature sensor 900, explained later, provided outside the battery rack 100.

The detailed operation of the control unit 160 will be described in more detail below.

The coolant tank 200 is spaced apart from the battery rack 100 by a predetermined distance, and may have a predetermined coolant 220.

Hereinafter, the coolant tank 200 will be described in more detail with reference to FIGS. 3 and 4.

Figure 3:
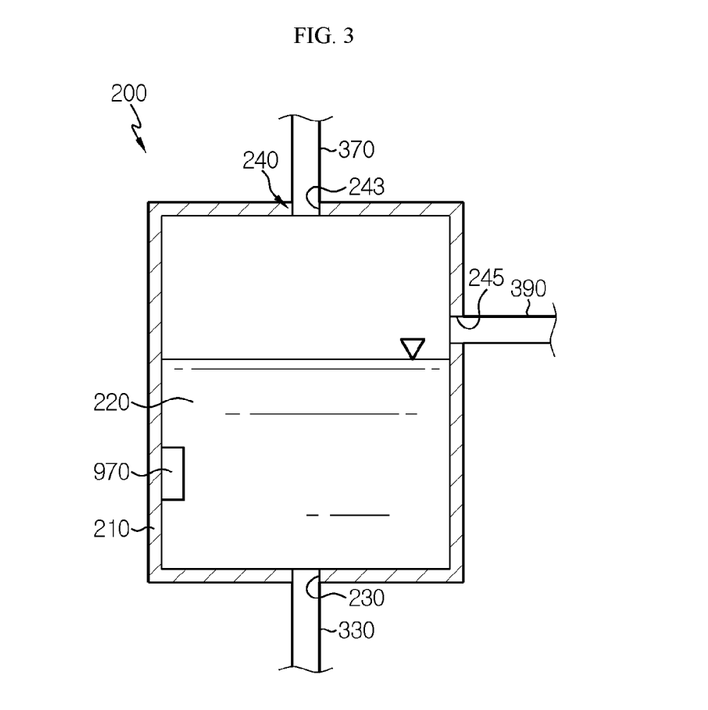
FIGS. 3 and 4 are diagrams for illustrating a coolant tank according to various embodiments of the energy storage system according to an embodiment of the present disclosure.
Figure 4:
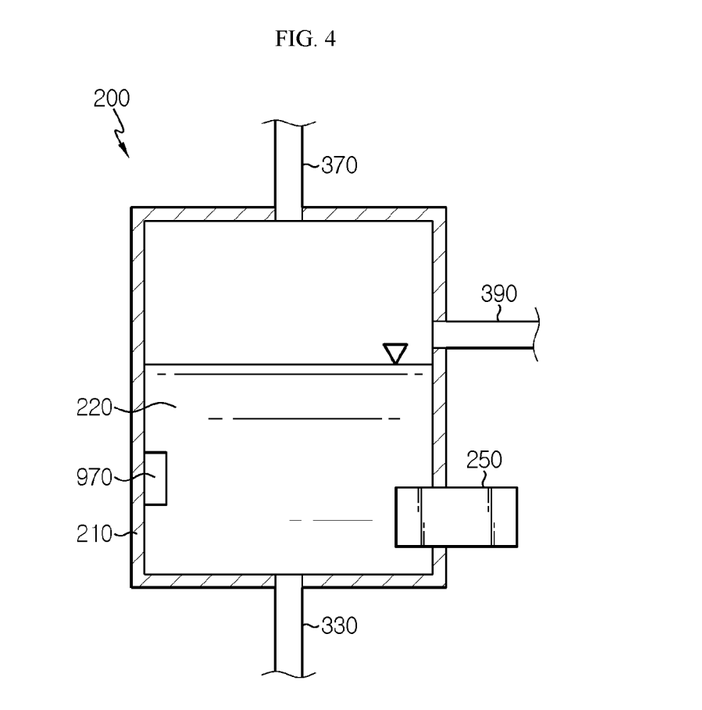

FIGS. 3 and 4 are diagrams for illustrating a coolant tank according to various embodiments of the energy storage system according to an embodiment of the present disclosure.

Referring to FIG. 3, the coolant tank 200 may include a tank body 210, a coolant 220, a coolant outlet port 230, and a coolant inlet port 240.

The tank body 210 may accommodate the coolant 220. For this, an accommodation space capable of accommodating the coolant 220 may be provided in the tank body 210.

The coolant 220 may be provided as a cooling fluid capable of cooling the plurality of battery cells 110 of the battery rack 100. In this embodiment, it will be described that the coolant 220 is water.

The coolant outlet port 230 is for discharging the coolant 220 toward the battery rack 100, and may be provided to the tank body 210 to communicate with the inner space of the tank body 210.

The coolant outlet port 230 communicates with a first pipe 330 of the pipe unit 300, explained later, and may discharge the coolant 220 inside the tank body 210 toward the first pipe 330 of the pipe unit 300, explained later.

The coolant inlet port 240 is spaced apart from the coolant outlet port 230, and the coolant 220 discharged from the battery rack 100 may be introduced through the coolant inlet port 240. The coolant inlet port 240 may be provided to the tank body 210 to communicate with the inner space of the tank body 210.

The coolant inlet port 240 may include a first inlet port 243 and a second inlet port 245.

The first inlet port 243 may be provided to the tank body 210 to communicate with a third pipe 370 of the pipe unit 300, explained later, and communicate with the inner space of the tank body 210. The first inlet port 243 may guide the coolant 220 sent from the third pipe 370 side of the pipe unit 300, explained later, into the tank body 210.

The second inlet port 245 may be provided to the tank body 210 to communicate with a fourth pipe 390 of a pipe unit 300, explained, and communicate with the inner space of the tank body 210. The second inlet port 245 may guide the coolant 220 sent from the fourth pipe 390 of the pipe unit 300, explained later, into the tank body 210.

Referring to FIG. 4, the coolant tank 200 may further include a heater unit 250.

The heater unit 250 is mounted to the tank body 210 of the coolant tank 200, and may heat the coolant 220 inside the tank body 210 to raise the temperature of the coolant 220. Meanwhile, a third temperature sensor 970 of the temperature sensor unit 900, explained later, for detecting or measuring the temperature of the coolant 200 inside the tank body 210 may be provided inside the tank body 210 of the coolant tank 200.

The operation of the heater unit 250 will be described in more detail with reference to FIG. 9.

Referring to FIG. 1 again, the pipe unit 300 is for circulating the coolant 220 between the battery rack 100 and the coolant tank 200, and may connect the coolant tank 200 and the battery rack 100.

The pipe unit 300 may include a first pipe 330, a second pipe 350, a third pipe 370, and a fourth pipe 390.

The first pipe 330 may connect the battery rack 100 and the coolant tank 200. The pump unit 400 and an opening/closing valve 500, explained later, may be connected to the first pipe 330.

The second pipe 350 may connect the battery rack 100 and a first heat exchanger 630 of the heat exchange unit 600, explained later.

The third pipe 370 may connect the first heat exchanger 630 of the heat exchange unit 600, explained later, and the coolant tank 200. Specifically, the third pipe 370 may be connected to the first inlet port 243 of the coolant inlet port 240 of the coolant tank 200. A diverging valve 700, explained later, and the first temperature sensor 930 of the temperature sensor unit 900, explained later, may be connected to the third pipe 370.

The fourth pipe 390 may connect the diverging valve 700, explained later, and the coolant tank 200. Specifically, the fourth pipe 390 may be connected to the second inlet port 245 of the coolant inlet port 240 of the coolant tank 200. A second heat exchanger 650 of the heat exchange unit 600, explained later, and a second temperature sensor 950 of the temperature sensor unit 900, explained later, may be connected to the fourth pipe 390.

The pump unit 400 is to control the supply of the coolant 220 toward the battery rack 100, is connected to the pipe unit 300, and may be disposed between the coolant tank 200 and the battery rack 100.

The pump unit 400 may be disposed between the inlet port 124 of the battery rack 100 and the coolant outlet port 230 of the coolant tank 200.

More specifically, the pump unit 400 is connected to the first pipe 330 of the pipe unit 300, and may be disposed between the opening/closing valve 500 and the battery rack 100.

Meanwhile, the energy storage system 10 may further include an opening/closing valve 500, a heat exchange unit 600, and a diverging valve 700.

The opening/closing valve 500 may decide whether to supply the coolant 220 of the coolant tank 200 to the battery rack 100 or stop the supply of the coolant 200 to the battery rack 100 through manual or automatic turning-on/off operation by user manipulation or the like.

The opening/closing valve 500 is connected to the pipe unit 300, and may be provided between the pump unit 400 and the coolant outlet port 230 of the coolant tank 200.

The heat exchange unit 600 is to manage the temperature of the coolant 220 that has passed through the battery rack 100, and may be disposed between the outlet port 126 of the battery rack 100 and the at least one coolant inlet port 240 of the coolant tank 200. The heat exchange unit 600 may be provided by at least one or in plurality. Hereinafter, in this embodiment, it will be described that the heat exchange unit 600 is provided in plurality.

The plurality of heat exchange units 600 may include a first heat exchanger 630 and a second heat exchanger 650.

The first heat exchanger 630 may be disposed between the battery rack 100 and the diverging valve 700. Specifically, the first heat exchanger 630 may guide the cooling of the coolant 220 delivered through the second pipe 350 of the pipe unit 300. This first heat exchanger 630 may be provided as a radiator.

The second heat exchanger 650 is spaced apart from the first heat exchanger 630 by a predetermined distance, and may be disposed between the diverging valve 700 and the coolant tank 200. Specifically, the second heat exchanger 650 may guide the cooling of the coolant 220 delivered through the fourth pipe 390 of the pipe unit 300. This second heat exchanger 650 may be provided as a radiator.

The diverging valve 700 is connected to the pipe unit 300, and may be provided between the at least one heat exchange unit 600 and the coolant tank 200.

The diverging valve 700 will be described in more detail with reference to FIG. 5 below.

Figure 5:
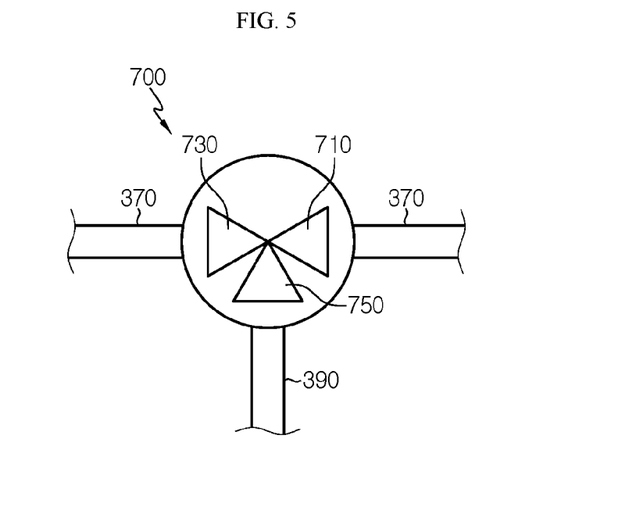
FIG. 5 is a diagram for illustrating a diverging valve of the energy storage system according to an embodiment of the present disclosure.

FIG. 5 is a diagram for illustrating a diverging valve of the energy storage system according to an embodiment of the present disclosure.

Referring to FIG. 5, the diverging valve 700 may include an inlet portion 710, an outlet portion 730, and a second diverging portion 750.

The inlet portion 710 may be provided at one side of the diverging valve 700. The coolant 220 (see FIG. 1) that has passed through the first heat exchanger 630 (see FIG. 1) of the heat exchange unit 600 (see FIG. 1) may be introduced into the inlet portion 710.

The outlet portion 730 operates to be opened and closed, and may send the coolant 220 (see FIG. 1) introduced from the inlet portion 710 to the third pipe 370 of the pipe unit 300 (see FIG. 1). The coolant 220 (see FIG. 1) discharged through the outlet portion 730 may be re-introduced into the coolant tank 200 through the third pipe 370.

The diverging portion 750 may be opened and closed, and may be provided between the inlet portion 710 and the outlet portion 730. The diverging portion 750 may send the coolant 220 (see FIG. 1) introduced from the inlet portion 710 to the fourth pipe 390 of the pipe unit 300 (see FIG. 1). The coolant (220, see FIG. 1) discharged through the diverging portion 750 may be re-introduced into the coolant tank 200 through the fourth pipe 390.

Referring to FIG. 1 again, the energy storage system 10 may further include a fan unit 800 and a temperature sensor 900.

The fan unit 800 is for cooling the at least one heat exchange unit 600 and may be provided in a number corresponding to the number of the at least one heat exchange unit 600.

The fan unit 800 may include a first blowing fan 830 and a second blowing fan 850.

The first blowing fan 830 may be disposed near the first heat exchanger 630 of the heat exchange unit 600. The first blowing fan 830 may include a cooling fan. The first blowing fan 830 may send out a cooling air to the first heat exchanger 630, and may appropriately change the cooling capacity as needed by adjusting the rotation speed (RPM) of the cooling fan.

The second blowing fan 850 may be disposed near the second heat exchanger 650 of the heat exchange unit 600.

The second blowing fan 850 may include a cooling fan. The first blowing fan 850 may send out a cooling air to the second heat exchanger 650, and may appropriately change the cooling capacity as needed by adjusting the rotation speed (RPM) of the cooling fan.

The temperature sensor unit 900 is for measuring or sensing temperature, and may be provided at a specific point or a specific component of the energy storage system 10.

The temperature sensor unit 900 may be provided by at least one or in plurality. Hereinafter, in this embodiment, it will be described that the temperature sensor 900 is provided in plurality.

The plurality of temperature sensor units 900 may include a first temperature sensor 930, a second temperature sensor 950, and a third temperature sensor 970.

The first temperature sensor 930 is provided in the third pipe 370 of the pipe unit 370, and may be disposed between the first heat exchanger 630 of the heat exchange unit 600 and the diverging valve 700. The first temperature sensor 930 may detect or measure the temperature of the coolant 200 that has passed the first heat exchanger 630 of the heat exchange unit 600.

The second temperature sensor 950 is provided in the fourth pipe 390 of the pipe unit 370, and may be disposed between the second heat exchanger 650 of the heat exchange unit 600 and the coolant tank 200. The second temperature sensor 950 may detect or measure the temperature of the coolant 200 that has passed through the second heat exchanger 650 of the heat exchange unit 600.

The third temperature sensor 970 may be provided inside the tank body 210 of the coolant tank 200. The third temperature sensor 970 may sense or measure the temperature of the coolant 220 in the tank body 210.

Hereinafter, the cooling mechanism of the energy storage system 10 according to this embodiment will be described in more detail.

Figure 6:
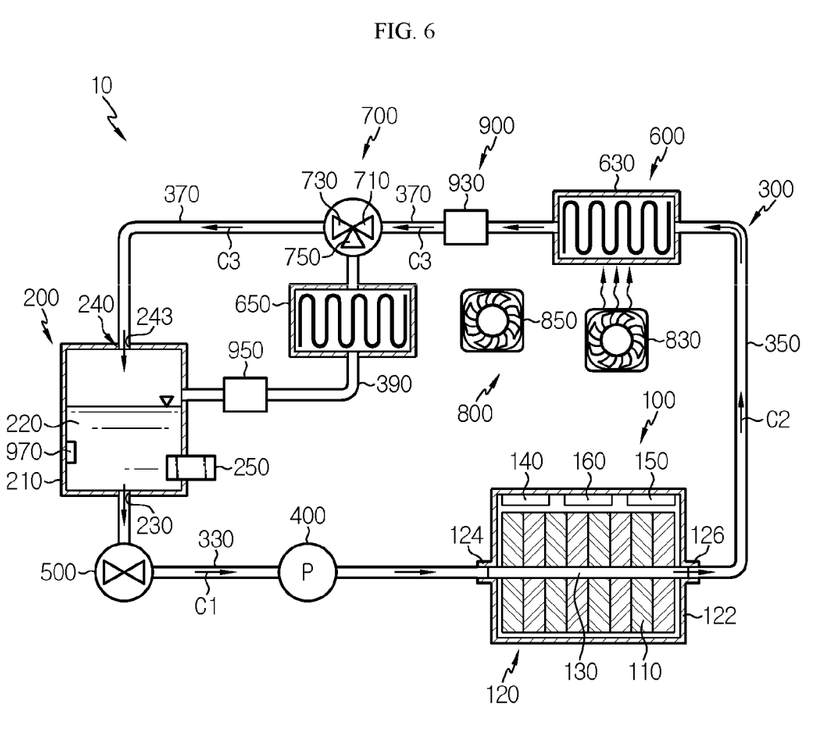
FIGS. 6 and 7 are diagrams for illustrating a cooling mechanism of the energy storage system according to an embodiment of the present disclosure.
Figure 7:
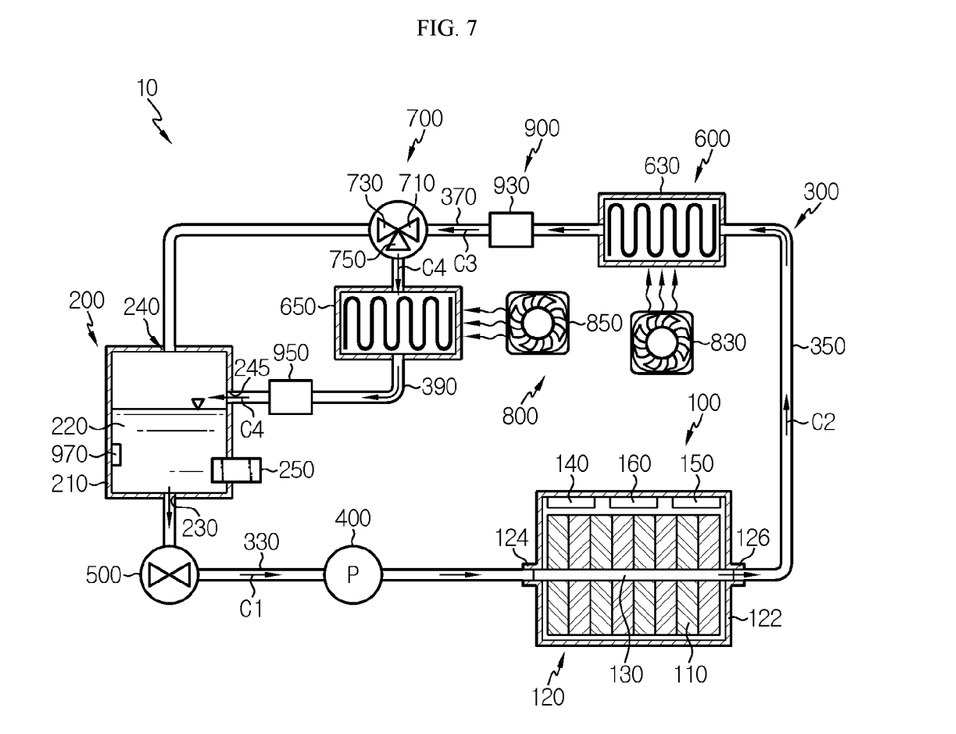

FIGS. 6 and 7 are diagrams for illustrating a cooling mechanism of the energy storage system according to an embodiment of the present disclosure.

Referring to FIG. 6, the control unit 160 of the battery rack 100 of the energy storage system 10 may control the temperature of the plurality of battery cells 110 of the battery rack 100 to be maintained in a preset temperature range.

The control unit 160 may control the opening/closing valve 500 to move the coolant 220 of the coolant tank 200 to the battery rack 110. When the opening/closing valve 500 is opened, the coolant 220, C1 may move from the coolant tank 200 to the battery rack 100. Here, the control unit 160 may control the pump unit 400 to control the supply amount or supply speed of the coolant 220, C1.

The coolant 220, C1 may be guided to exit the coolant tank 200 and pass the cooling channel 130 of the battery rack 100 through the first pipe 330 of the pipe unit 300 to cool the plurality of battery cells 110 in the battery rack 100, or to maintain the temperature of the plurality of battery cells 110 at a preset temperature.

The control unit 160 may adjust the supply amount, the supply rate, or the like of the coolant 220 passing through the cooling channel 130, through the temperature information obtained through the rack temperature sensor 140, so that the battery cells 110 may be maintained in a preset temperature range.

For example, the control unit 160 may increase the supply amount or the supply rate of the coolant 220 passing through the cooling channel 130 when the battery cells 110 are overheated.

In addition, if an abnormal situation such as a flame situation of the battery cells 110 occurs, when a flame or smoke is detected from the fire sensor 150, the control unit 160 may increase the supply amount or the supply rate of the coolant 220 passing through the cooling channel 130 further.

The coolant 220, C2 that have passed through the cooling channel 130 of the battery rack 100 may move to the first heat exchanger 630 of the heat exchange unit 600 through the second pipe 350 of the pipe unit 300. Here, the coolant 220, C2 after passing through the cooling channel 130 of the battery rack 100 may have a higher temperature than the coolant 220, C1 before passing through the cooling channel 130.

The control unit 160 may drive the first blowing fan 830 of the fan unit 800 to lower the temperature of the coolant 220, C2 that have passed through the cooling channel 130 of the battery rack 100, when the coolant 220, C2 passes through the first heat exchanger 630 of the heat exchange unit 600.

Here, the first blowing fan 830 of the fan unit 800 may be electrically connected to the control unit 160, the rack temperature sensor 140, and the temperature sensor unit 900. The control unit 160 may adjust the cooling amount of the coolant 220, C2 by changing the fan rotation amount of the first blowing fan 830 according to the temperature information of the rack temperature sensor 140 and the temperature sensor unit 900.

If the coolant 220, C3 that has passed the first heat exchanger 630 is lower than a preset temperature, the control unit 160 may open the inlet portion 710 and the outlet portion 730 of the diverging valve 700 and close the diverging portion 750 of the diverging valve 700.

Accordingly, the coolant 220, C3 that have passed through the first heat exchanger 630 may be re-introduced into the coolant tank 200 through the inlet portion 710 and the outlet portion 730 of the diverging valve 700. Here, the coolant 220, C3 after passing through the first heat exchanger 630 may have a lower temperature than the coolant 220, C2 before passing through the first heat exchanger 630.

The coolant 230 re-introduced into the coolant tank 200 may circulate along the pipe unit 300 according to the control of the control unit 160 or the like until the temperature of the battery cells 110 in the battery rack 100 meets a preset temperature range.

Meanwhile, in the energy storage system 10, the coolant 220, C3 that has passed the first heat exchanger 630 may be higher than the preset temperature.

Referring to FIG. 7, when the coolant 220, C3 that has passed through the first heat exchanger 630 is higher than the preset temperature, the control unit 160 may open the inlet portion 710 and the diverging portion 750 of the diverging valve 700 and close the outlet portion 730 of the diverging valve 700 through the first temperature sensor 930.

Accordingly, the coolant 220, C3 that has passed through the first heat exchanger 630 may pass through the second heat exchanger 650 of the heat exchange unit 600 via the inlet portion 710 and the diverging portion 750 of the diverging valve 700.

The control unit 160 may drive the second blowing fan 850 of the fan unit 800 to lower the temperature of the coolant 220, C4 emitting from the diverging portion 750 of the diverging valve 700, when the coolant 220, C4 passes through the second heat exchanger 650 of the heat exchange unit 600.

Here, the second blowing fan 850 of the fan unit 800 may be electrically connected to the control unit 160, the rack temperature sensor 140, and the temperature sensor unit 900. The control unit 160 may change the fan rotation amount of the second blowing fan 850, like the first blowing fan 830, according to the temperature information of the rack temperature sensor 140 and the temperature sensor unit 900 to adjust the cooling amount of the coolant 220, C4.

As such, in this embodiment, when the coolant 220, C3 that has passed through the first heat exchanger 630 is higher than the preset temperature, in the energy storage system 10, the coolant 220, C3 may be diverged to the second heat exchanger 650 through the diverging portion 750 of the diverging valve 700 to additionally cool the coolant 220, C4 or additionally control the temperature of the coolant 220, C4 through the second heat exchanger 650 and the second blowing fan 850.

The coolant 220, C4 that has passed through the second heat exchanger 650 may be re-introduced into the coolant tank 200 through the fourth pipe 390 of the pipe unit 300. Here, the coolant 220, C4 passing through the second heat exchanger 650 may have a lower temperature than the coolant 220, C3 passing through the first heat exchanger 630.

The coolant 230 re-introduced into the coolant tank 200 may circulate along the pipe unit 300 according to the control of the control unit 160 until the temperature of the battery cells 110 in the battery rack 100 meets the preset temperature range.

As such, the energy storage system 10 according to this embodiment may appropriately perform additional cooling through the second heat exchanger 650 by controlling the diverging valve 700 according to the temperature of the coolant 220 that has passed through the battery rack 100 and the first heat exchanger 630.

That is, if the temperature of the coolant 220 is sufficiently lower than the preset temperature range, the coolant 220 is directly moved to the coolant tank 200 without passing through the second heat exchanger 650, and only when the temperature of the coolant 220 is higher than the preset temperature range, additional cooling may be performed through the second heat exchanger 650.

Accordingly, in this embodiment, through the diverging valve 700, the second heat exchanger 650 and the second blowing fan 850 are selectively driven, so that the efficiency of the entire cooling system may be significantly increased.

Figure 8:
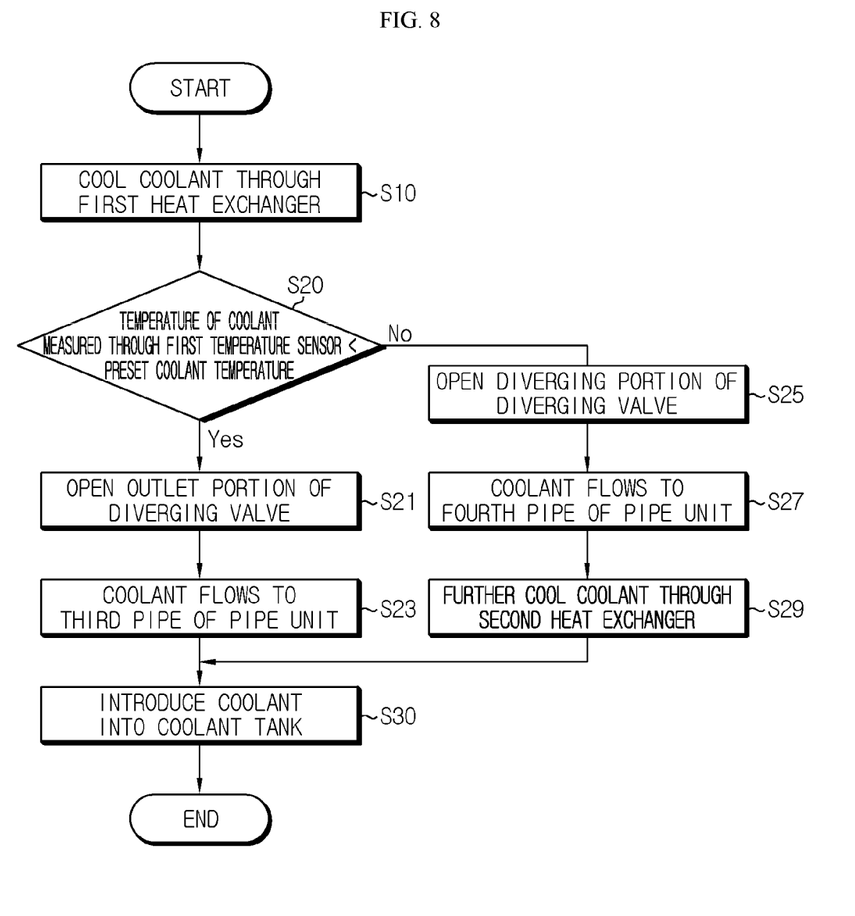
FIG. 8 is a flowchart for illustrating the cooling mechanism of the energy storage system according to an embodiment of the present disclosure.

Hereinafter, the flow chart about the cooling mechanism according to the flow of the coolant 220 after passing through the first heat exchanger 630 of the energy storage system 10 according to this embodiment will be described.

FIG. 8 is a flowchart for illustrating the cooling mechanism of the energy storage system according to an embodiment of the present disclosure.

Referring to FIG. 8, first, a coolant may be cooled through the first heat exchanger (S10). Thereafter, the control unit may compare the temperature of the coolant measured through the first temperature sensor with a preset coolant temperature (S20). If the temperature of the coolant measured through the first temperature sensor is lower than the preset coolant temperature, the control unit may open the outlet portion of the diverging valve (S21).

Accordingly, the coolant may flow to the third pipe of the pipe unit (S23) and may be introduced into the coolant tank (S30).

If the temperature of the coolant measured through the first temperature sensor is equal to or higher than the preset coolant temperature, the control unit may open the diverging portion of the diverging valve (S25).

Accordingly, the coolant may flow to the fourth pipe of the pipe unit (S27), may be further cooled through the second heat exchanger (S29), and then may be introduced into the coolant tank (S30).

As such, the energy storage system 10 according to this embodiment may perform selective additional cooling of the coolant 220 according to the temperature of the coolant 220, through the diverging valve 700 and the second heat exchanger 650, and thus it is possible to maximize cooling efficiency or temperature management efficiency.

Figure 9:
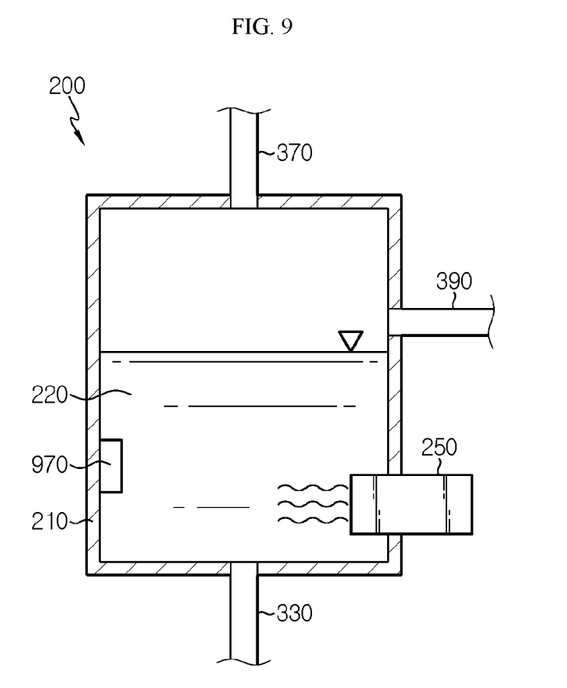
FIG. 9 is a diagram for illustrating a coolant tank heating mechanism of the energy storage system according to an embodiment of the present disclosure.

FIG. 9 is a diagram for illustrating a coolant tank heating mechanism of the energy storage system according to an embodiment of the present disclosure.

Referring to FIG. 9, in the case of the coolant 220 inside the coolant tank 200, when the outside temperature is low, such as in winter, the coolant 220 inside the tank body 210 of the coolant tank 200 may be supercooled or frozen.

At this time, the control unit 160 (see FIG. 2) operates the heater unit 250 when the temperature of the coolant 220 inside the tank body 210 of the coolant tank 200 measured through the third temperature sensor 970 is lower than the preset temperature. The heater unit 250 may heat the coolant 220 inside the tank body 210 of the coolant tank 200 until it reaches the preset temperature.

On the other hand, the control unit 160 (see FIG. 2) may operate the opening/closing valve 300, the pump unit 400, or the like to circulate the coolant heated to the predetermined temperature when the outdoor temperature such as in winter is low as described above. According to the circulation of the coolant heated to the predetermined temperature, freezing or the like of the pipe unit 300 may be prevented.

According to various embodiments as described above, it is possible to provide the energy storage system 10 capable of more efficiently managing the temperature of the battery cell 110 or the area surrounding the battery cell 110.

In addition, according to various embodiments as described above, it is possible to provide an energy storage system 10 capable of maintaining an appropriate temperature of the battery cell 110 according to the management temperature of the battery cell 110.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. An energy storage system, comprising:
   a battery rack including at least one battery cell and having a cooling channel for cooling the at least one battery cell;
   a coolant tank spaced apart from the battery rack by a predetermined distance and having a predetermined coolant;
   a first heat exchanger disposed between the battery rack and the coolant tank;
   a pipe configured to connect the coolant tank and the battery rack and configured to circulate the coolant between the battery rack and the coolant tank, the pipe comprising:
      a first pipe extending between the first heat exchanger and the coolant tank;
      a diverging valve connected to the first pipe; and
      a second pipe extending between the diverging valve and the coolant tank;
   a second heat exchanger connected to the second pipe to be between the diverging valve and the coolant tank; and
   a pump connected to the pipe and configured to adjust the supply of the coolant to the battery rack.

2. The energy storage system according to claim 1, wherein the battery rack includes:
   an inlet port into which the coolant is introduced, the inlet port being configured to communicate with the cooling channel; and
   an outlet port spaced apart from the inlet port by a predetermined distance and configured to communicate with the cooling channel,
   wherein the coolant tank includes:
      a coolant outlet port configured to discharge the coolant toward the battery rack; and
      at least one coolant inlet port spaced apart from the coolant outlet port and configured such that the coolant discharged from the battery rack is introduced thereto,
   wherein the pump is disposed between the inlet port of the battery rack and the coolant outlet port of the coolant tank.

3. The energy storage system according to claim 2, further comprising:
   an opening/closing valve connected to the pipe and provided between the pump and the coolant outlet port of the coolant tank.

4. The energy storage system according to claim 1, further comprising:
   at least one fan configured to cool the first heat exchanger.

5. The energy storage system according to claim 1, wherein the battery rack includes at least one rack temperature sensor configured to detect a temperature of the at least one battery cell.

6. The energy storage system according to claim 1, wherein the battery rack includes a fire sensor configured to detect a fire of the at least one battery cell.

7. The energy storage system according to claim 1, wherein the coolant tank includes a heater configured to raise a temperature of the coolant.

8. The energy storage system according to claim 1, further comprising a heater in the coolant tank.

9. The energy storage system according to claim 1, wherein the pipe further comprises a third pipe extending between the coolant tank and the battery rack, the pump being in the third pipe.

10. The energy storage system according to claim 9, wherein the pipe further comprises a fourth pipe extending between the battery rack and the first heat exchanger.

* * * * *